United States Patent
Lee et al.

(10) Patent No.: US 9,578,210 B2
(45) Date of Patent: Feb. 21, 2017

(54) A/V RECEIVING APPARATUS AND METHOD FOR DELAYING OUTPUT OF AUDIO SIGNAL AND A/V SIGNAL PROCESSING SYSTEM

(71) Applicant: SAMSUNG ELECTRONICS CO., LTD., Suwon-si (KR)

(72) Inventors: Byeong-hu Lee, Hwaseong-si (KR); Yong-hee Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 14/296,855

(22) Filed: Jun. 5, 2014

(65) Prior Publication Data
US 2015/0077633 A1    Mar. 19, 2015

(30) Foreign Application Priority Data
Sep. 13, 2013   (KR) .................. 10-2013-0110314

(51) Int. Cl.
| | |
|---|---|
| H04N 7/18 | (2006.01) |
| H04N 5/04 | (2006.01) |
| H04N 21/43 | (2011.01) |
| H04N 21/436 | (2011.01) |
| H04N 21/439 | (2011.01) |

(52) U.S. Cl.
CPC ............ *H04N 5/04* (2013.01); *H04N 21/4307* (2013.01); *H04N 21/4392* (2013.01); *H04N 21/43615* (2013.01)

(58) Field of Classification Search
CPC .............. H04N 21/443; H04N 21/4586; H04N 21/4302; H04N 21/43635; H04N 21/44227

USPC .......................................................... 725/80
See application file for complete search history.

(56) References Cited

U.S. PATENT DOCUMENTS

| | | | |
|---|---|---|---|
| 7,511,763 B2 | 3/2009 | Sasaki | |
| 8,175,298 B2* | 5/2012 | Mitani et al. | ................. 381/123 |
| 8,201,211 B2* | 6/2012 | Proust | ................... G06F 21/575 |
| | | | 707/999.203 |
| 8,351,624 B2* | 1/2013 | Motomura | .................... 381/123 |

(Continued)

FOREIGN PATENT DOCUMENTS

| | | |
|---|---|---|
| EP | 2 063 662 A2 | 5/2009 |
| JP | 4427733 | 12/2009 |
| JP | 2010-273078 | 12/2012 |

OTHER PUBLICATIONS

European Search Report dated Feb. 10, 2015 issued in corresponding European Patent Application 14175084.4.

*Primary Examiner* — Nasser Goodarzi
*Assistant Examiner* — Michael B Pierorazio
(74) *Attorney, Agent, or Firm* — Staas & Halsey LLP

(57) ABSTRACT

An A/V receiving apparatus is disclosed. The A/V receiving apparatus includes a first interface connected to a display apparatus, a second interface connected to an audio signal output apparatus, and a controller configured to, when a video signal and an audio signal are received, transmit an audio signal return request to the display apparatus along with the video signal and the audio signal, when the audio signal is returned from the display apparatus, calculate an output time difference of the video signal and the audio signal based on a return timing of the audio signal, delay the audio signal according to the output time difference and transmit the audio signal to the audio signal output apparatus.

20 Claims, 7 Drawing Sheets

(56) References Cited

U.S. PATENT DOCUMENTS

| | | | | |
|---|---|---|---|---|
| 8,451,375 | B2* | 5/2013 | Ejima | H04N 5/04 348/512 |
| 2006/0140265 | A1* | 6/2006 | Igler et al. | 375/240.01 |
| 2006/0149850 | A1* | 7/2006 | Bowman | 709/231 |
| 2006/0242314 | A1* | 10/2006 | Logvinov et al. | 709/231 |
| 2007/0046835 | A1* | 3/2007 | Kim et al. | 348/731 |
| 2008/0063216 | A1* | 3/2008 | Sakata et al. | 381/80 |
| 2008/0320545 | A1* | 12/2008 | Schwartz | 725/135 |
| 2009/0091655 | A1* | 4/2009 | Russell et al. | 348/515 |
| 2010/0315553 | A1* | 12/2010 | Takatsuji | G06F 21/10 348/516 |
| 2010/0321479 | A1* | 12/2010 | Yang | 348/51 |
| 2011/0051002 | A1* | 3/2011 | Oh | 348/569 |
| 2011/0068736 | A1* | 3/2011 | Chartier et al. | 320/107 |
| 2011/0134338 | A1* | 6/2011 | Toba | 348/734 |
| 2011/0142245 | A1* | 6/2011 | Toba et al. | 381/22 |
| 2011/0176057 | A1* | 7/2011 | Okamura et al. | 348/554 |
| 2011/0234916 | A1* | 9/2011 | Fujita et al. | 348/738 |
| 2012/0002562 | A1* | 1/2012 | Kawade | 370/252 |
| 2012/0042346 | A1* | 2/2012 | Yoshida et al. | 725/81 |
| 2012/0133829 | A1* | 5/2012 | Nakade | 348/515 |
| 2012/0136612 | A1* | 5/2012 | Vanderhoff et al. | 702/119 |
| 2012/0188456 | A1* | 7/2012 | Kuroyanagi | 348/569 |
| 2012/0237184 | A1 | 9/2012 | Takeuchi | |
| 2013/0021536 | A1* | 1/2013 | Kamida | 348/739 |
| 2013/0051578 | A1* | 2/2013 | Chu et al. | 381/94.1 |
| 2013/0051584 | A1* | 2/2013 | Higuchi et al. | 381/123 |
| 2014/0193134 | A1* | 7/2014 | Maeda et al. | 386/231 |
| 2015/0074729 | A1* | 3/2015 | Kim et al. | 725/80 |
| 2015/0237441 | A1* | 8/2015 | Muramatsu | H04R 3/00 381/120 |

* cited by examiner

A/V RECEIVING APPARATUS AND METHOD FOR DELAYING OUTPUT OF AUDIO SIGNAL AND A/V SIGNAL PROCESSING SYSTEM

CROSS-REFERENCE TO RELATED APPLICATIONS

This application claims priority from Korean Patent Application No. 10-2013-0110314 filed on Sep. 13, 2013 in the Korean Intellectual Property Office, the disclosure of which is incorporated herein by reference in its entirety.

BACKGROUND

1. Field

Aspects of the exemplary embodiments relate to an A/V receiving apparatus, which delays output of an audio signal, a method thereof, and an A/V signal processing system, more particularly to an A/V receiving apparatus that delays output of an audio signal in consideration of time required to process a video signal in a display apparatus, a method thereof, and an A/V signal processing system thereof.

2. Description of the Related Art

A display apparatus outputs a video signal on a screen after going through certain processing procedures. In this case, a display apparatus may process a video signal along with an audio signal, and output the audio signal through a speaker embedded inside.

Recently, in order to obtain images in various modes and sound in high quality, an image can be displayed by using a display apparatus, and sound can be heard by using a separate audio apparatus connected to the display apparatus. As such, if an image and sound are output by using different and separate apparatuses, an output time difference can occur between the image and the sound.

Specifically, a display apparatus, in order to provide a user with more functions, has provided various screen modes on an image to be displayed. For example, a screen mode such as a 3D mode with which a user can view a 3D image and a high definition mode for improved definition of a screen are provided. Accordingly, a display apparatus processes a video signal to be matched with a screen mode selected by a user, and displays the video signal as an image. In this process, a lot of time needs to be spent in processing a video signal, consequently delaying display of an image. As such, if display of an image is delayed, an image will not be matched with the corresponding sound, and thus a user experiences inconvenience in using the display apparatus.

For example, when a display apparatus processes a video signal and displays an image, and an A/V receiving apparatus connected to a display apparatus processes an audio signal and outputs sound, the time required for processing signals in each apparatus is known to each other and may be different, and thus synchronization between a video signal and an audio signal is not aligned.

In order to align sync between a video signal and an audio signal, a user has directly set a delay value of an audio, but in this case, a user depends only on the user's visual and auditory senses, and thus it is hard to set an accurate delay value.

In addition, when a format of a video signal or an audio signal changes, a signal processing method changes accordingly, and consequently time required to process a signal can change. In this case, sync between a video signal and an audio signal becomes mis-aligned again, and therefore, a user has to re-set a delay value for an audio signal.

SUMMARY

Additional aspects and/or advantages will be set forth in part in the description which follows and, in part, will be apparent from the description, or may be learned by practice of the disclosure.

An aspect of the exemplary embodiments is designed in accordance with the above-described necessities and is purposed to address the afore-said drawback. The disclosure is purposed to provide an A/V receiving apparatus which checks time required to process a video signal in a display apparatus and delays output of an audio signal, a method thereof, and an A/V signal processing system.

A display apparatus according to an exemplary embodiment includes a first interface connected to a display apparatus, a second interface connected to an audio signal output apparatus, and a controller configured to, when a video signal and an audio signal are received, transmit an audio signal return request to the display apparatus along with the video signal and the audio signal, when the audio signal is returned from the display apparatus, calculate an output time difference of the video signal and the audio signal based on a return timing of the audio signal, delay the audio signal according to the output time difference and transmit the audio signal to the audio signal output apparatus.

In this case, the controller may calculate a first time required to process the video signal in the display apparatus, based on a transmitting timing of the audio signal return and a return timing of the audio signal, calculate a second time required from a receiving timing of the audio signal, to an output timing of the audio signal from the audio signal output apparatus, and calculate the output time difference by subtracting the second time from the first time.

The controller may calculate the second time by adding a first delay time required from a processing timing of the audio signal, to a transmitting timing of the audio signal to the audio signal output apparatus, and a second delay time required from a transmitting timing of the audio signal to the audio signal output apparatus, to an outputting timing of the audio signal by the audio signal output apparatus.

The audio signal return request may be a signal which activates a HDMI (High Definition Multimedia Interface)-based ARC (Audio Return Channel) function and requests the audio signal processed along with the video signal to return to the A/V receiving apparatus.

Meanwhile, the apparatus can further include a signal processor configured to process the audio signal; and a delay unit which delays and outputs the signal-processed audio signal by a pre-set delay value. The controller may update the pre-set delay value of the delay unit by using the calculated output time difference.

The apparatus can further include an A/V signal receiving unit which receives the video signal and the audio signal.

Meanwhile, the apparatus may further include a recordable medium reader configured to read a recordable medium and read a content recorded in the recordable medium, wherein the controller receives the video signal and the audio signal consisting the content from the recordable medium reader.

Meanwhile, the A/V signal processing system according to an exemplary embodiment includes a display apparatus, and an A/V receiving apparatus configured to receive a video signal and an audio signal from an external source apparatus, transmit an audio signal return request to the display apparatus along with the video signal and the audio signal, when the audio signal is returned from the display apparatus, calculate an output time difference of the video signal and the audio signal based on a return time of the audio signal, and delay the audio signal according to the output time difference and transmit the audio signal to the audio signal output apparatus.

Herein, the display apparatus may include a display, a communicator connected to the A/V receiving apparatus which receives the audio signal return request along with the video signal and the audio signal, a signal processing unit configured to process and synchronize the video signal and audio signal, and a controller configured to control the communication unit to return the signal-processed audio signal to the A/V receiving unit according to the audio signal return request and display the audio-processed video signal.

In this case, the controller may activate a HDMI (High Definition Multimedia Interface)-based ARC (Audio Return Channel) function according to the audio signal return request, and return the signal-processed audio signal to the A/V receiving apparatus.

Meanwhile, the A/V receiving apparatus may calculate a first time required to process the video signal in the display apparatus, based on a transmitting timing of the audio signal return request and a return time of the audio signal, calculate a second time required from a receiving timing of the audio signal from the external source apparatus, to an outputting timing of the audio signal from the audio signal output apparatus, and calculate the output time difference by subtracting the second time from the first time.

In addition, the A/V receiving apparatus may calculate the second time by adding a first delay time required from a receiving timing of the audio signal from the external source apparatus, to a processing and outputting timing of the audio signal to the audio signal output apparatus, and the second delay time required from a transmitting timing of the audio signal to the audio signal output apparatus, to an outputting timing of the audio signal by the audio signal output apparatus.

Meanwhile, the A/V receiving apparatus may delay the audio-processed audio signal by using the calculated output time difference and transmit the audio signal to the audio signal output apparatus.

A method for delaying output of an audio signal according to an exemplary embodiment includes, when a video signal and an audio signal are received, transmitting an audio signal return request to the display apparatus along with the video signal and the audio signal; when the audio signal is returned, calculating an output time difference of the video signal and the audio signal based on a return time of the audio signal; and delaying the audio signal according to the output time difference and transmitting the audio signal to the audio signal output apparatus.

Meanwhile, the calculating an output time difference of the video signal and the audio signal may include calculating a first time required to process the video signal in the display apparatus based on a transmitting timing of the audio signal return request and a return time of the audio signal; calculating a second time required from a receiving time of the audio signal, to an outputting timing of the audio signal by the audio signal; and calculating the output time difference by deducting the first time and the second time.

Herein, the calculating the second time may include calculating the second time by adding a first delay time required from a receiving timing of the audio signal, to a processing and transmitting the audio signal to the audio signal output apparatus, and a second delay time required from a transmitting timing of the audio signal to the audio signal output apparatus, to an outputting timing of the audio signal by the audio signal.

The audio signal return request may be a signal to activate a HDMI (High Definition Multimedia Interface)-based ARC (Audio Return Channel) function, and requests to return the audio signal processed with the video signal in the display apparatus.

An A/V transceiver apparatus including a controller to transmit a video signal and an audio signal along with an audio signal return request, an audio signal processor to calculate an output time difference between the video signal and the audio signal based on a return time of a returned audio signal received in response to the audio signal return request, and a delay unit to delay the received audio signal by the calculated output time difference and to output the delayed audio signal.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Figure 1:
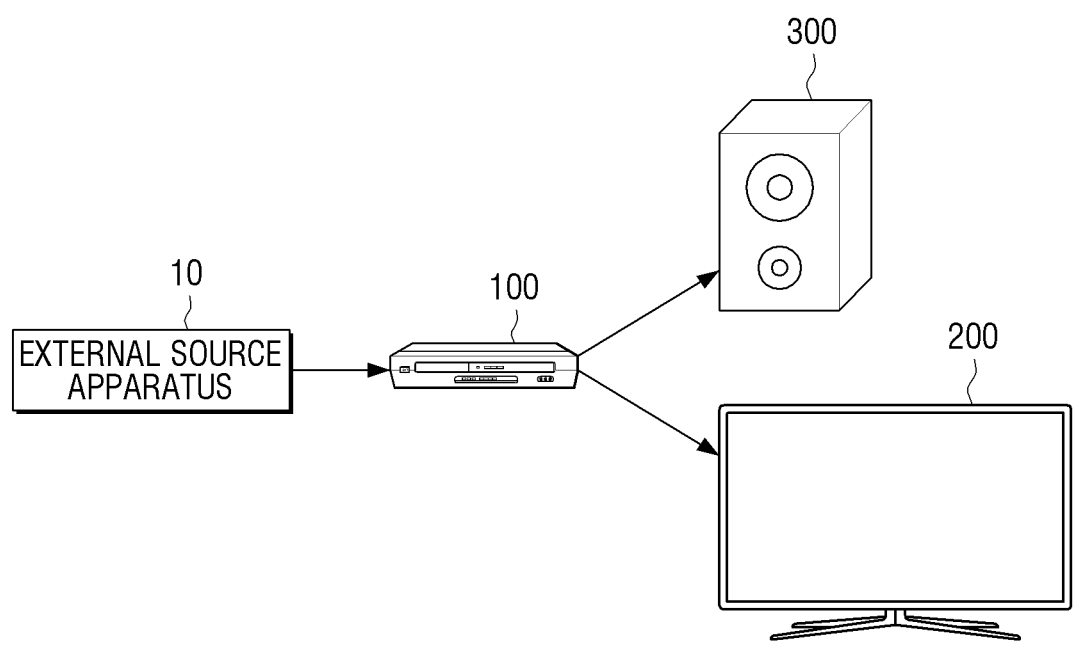
FIG. 1 illustrates an A/V signal processing system according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 illustrates an A/V signal processing system according to an exemplary embodiment. Referring to FIG. 1, an A/V signal processing system may be, for example, any kind of a home theater system which includes an A/V receiving apparatus 100, a display apparatus 200, and an audio signal output apparatus 300.

The A/V receiving apparatus 100 is an apparatus that receives a video signal and an audio signal from an external source apparatus 10 such as a set-top box or a game machine, and outputs the signals. A video signal is displayed through the display apparatus 200, and an audio signal is displayed through the audio signal output apparatus 300.

Specifically, the A/V receiving apparatus 100 transmits an audio signal return request to the display apparatus 200 along with a video signal and an audio signal, and receives returned audio signal from the display apparatus 200. Herein, the audio signal return request can be a signal which activates a HDMI (High Definition Multimedia Interface)-based ARC (Audio Return Channel) function, and requests an audio signal processed along with a video signal in the display apparatus 200 to return to the A/V receiving apparatus 100.

In more detail, a HDMI-based ARC function is a function newly added to the HDMI 1.4 features, which transmits an audio signal to an A/V receiver, that is to the A/V receiving apparatus 100, through the HDMI cable, instead of processing an audio signal in the display apparatus 200. The HDMI-based ARC function can transmit an audio signal from the A/V receiving apparatus 100 to the display apparatus 200, and from the display apparatus 200 to the A/V receiving apparatus 100 with only a HDMI cable, that is, without requiring an additional cable.

Meanwhile, when an audio signal is returned from the display apparatus 200 according to an audio signal return request, the A/V receiving apparatus 100, based on a return time of the returned audio signal, calculates an output time difference of a video signal and an audio signal, delays an audio signal based on the output time difference, and transmits the delayed audio signal to the audio signal output apparatus 300.

Herein, the returned audio signal is the audio signal processed along with the video signal in the display apparatus 200, and the time required to process a video signal in the display apparatus 200 can be calculated by using the returned audio signal. Therefore, the A/V receiving apparatus 100 can know the time required to process a video signal in the display apparatus 200, and thus can calculate the output time difference by subtracting the time required to process and output the audio signal from the aforementioned time.

More specifically, the A/V receiving apparatus 100, by measuring transmitting timing of an audio signal return request to the return time of an audio signal, can calculate a first time (T1) required to process a video signal by the display apparatus 200.

In addition, the A/V receiving apparatus 100 can calculate a second time (T2) which is required from receiving timing of an audio signal from an external source apparatus 10 to outputting timing of an audio signal in the audio signal output apparatus 300. By subtracting the second time from the first time, an output time difference can be calculated. Consequently, this output time difference can be a time difference between a video signal displayed in the display apparatus 200 and an audio signal outputted from the audio output apparatus 300.

When sync between a video signal and an audio signal is aligned, the output time difference will be "0." But, when sync between a video signal and an audio signal is not aligned, the output time difference may have a certain value. In this case, the A/V receiving apparatus 100 delays an audio signal according to or as much as the output time difference, and outputs the audio signal to the audio signal output apparatus 300.

The A/V signal processing system illustrated in FIG. 1 can confirm the time required for processing a video signal in the display apparatus 200, and thus can delay output of an audio signal to be aligned with time required to process a video signal. Accordingly, sync between a video signal displayed in the display apparatus 200 which is located apart from the A/V receiving apparatus 100 and an audio signal outputted from the audio signal output apparatus 300 can be aligned.

Figure 2:
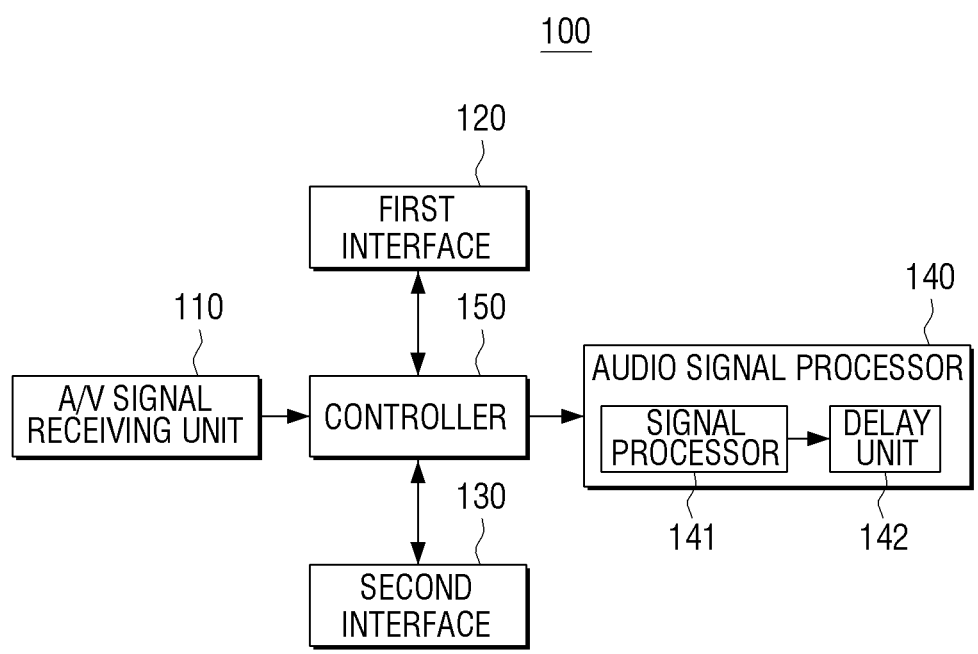
FIG. 2 is a block diagram describing the configurations of an A/V receiving apparatus according to an exemplary embodiment.

FIG. 2 is a block diagram describing the configurations of an A/V receiving apparatus according to an exemplary embodiment. Referring to FIG. 2, the A/V receiving apparatus 100 may include, for example, an A/V signal receiving unit 110, a first interface 120, a second interface 130, an audio signal processor 140, and a controller 150.

The A/V signal receiving unit 110 receives a video signal and an audio signal. The A/V signal receiving unit 110 can receive a video signal and an audio signal from the external source device 10 through HDMI (High Definition Multimedia Interface).

The first interface 120 can be connected to the display apparatus 200 and can transmit or receive a signal, such as the video signal, the audio signal, or the audio signal return request. And, the second interface 130 can be connected to the audio signal output apparatus 300 and can transmit or receive a signal, such as the audio signal. In this case, the first interface 120 and the second interface 130 can be connected to the display apparatus 200 and the audio signal output apparatus 300 through a HDMI cable.

The audio signal processor 140 includes the signal processor 141 and delay unit 142.

The signal processor 141 processes an audio signal received in the A/V signal receiving unit 110, for example, decoding processing can be performed according to a format of an audio signal.

The delay unit 142 can delay and output an audio signal which is signal-processed in the signal processor 141 according to or as much as a preset delay value. In other words, any of a variety of predetermined delay values may be used by the delay unit to delay the audio signal according to the time required for processing a video signal in the display apparatus 200.

The controller 150 controls overall operations of the A/V receiving apparatus 100.

Specifically, the controller 150 transmits an audio signal return request to the display apparatus 200 along with the video signal and the audio signal after a video signal and an audio signal are received by the A/V signal receiving unit 110.

Herein, the audio signal return request is a signal to activate a HDMI-based ARC function. Therefore, when the display apparatus 200 receives the audio signal return request, the HDMI-based ARC function is activated, and the audio signal processed along with the video signal is returned to the A/V receiving apparatus 200.

Meanwhile, the controller 150, when an audio signal is returned from the display apparatus 200, can calculate output time difference of the video signal and the audio signal based on a return time of the audio signal.

Specifically, the controller 150 can calculate the first time required to process the video signal in the display apparatus 200 based on transmitting timing of the audio signal return request and a return time of the audio signal. And, the second time which is required from receiving timing of the audio signal by the A/V signal receiving unit 110, to outputting timing of the audio signal from the audio signal output apparatus 300 can be calculated.

In addition, in calculating the second time, the controller 150 can use various methods as shown below. Specifically, the controller 150 calculates the first delay time which is required from receiving timing of the audio signal by the A/V signal receiving unit 110, to processing and transmitting the audio signal to the audio signal output apparatus 300. The second delay time which is required from transmitting timing of the processed audio signal to the audio signal output apparatus 300, to outputting timing of the audio signal by the audio signal output apparatus 300 is calculated. And then, the second time can be calculated by adding the first delay time to the second delay time.

The controller 150, by subtracting the second time from the first time, can calculate the output time difference.

The controller 150, can delay the audio signal according to the output time difference, and transmit the signal to the audio signal output apparatus 300. Herein, the controller 150, by using the output time difference, can update a preset delay value of the delay unit 142. Therefore, the delay unit 142 can delay the audio signal according to or as much as a delay value corresponding to the output time difference.

The A/V receiving apparatus 100 illustrated in FIG. 2 can identify both the time required to process a video signal in the display apparatus 200 and a time required for an audio signal to be processed in the A/V receiving apparatus 100 and outputted through the audio signal output apparatus 300. Accordingly, a video signal and an audio signal can be accurately synchronized by calculating the output time difference between a video signal and an audio signal and delaying an audio signal according to or as much as the output time difference.

Figure 3:
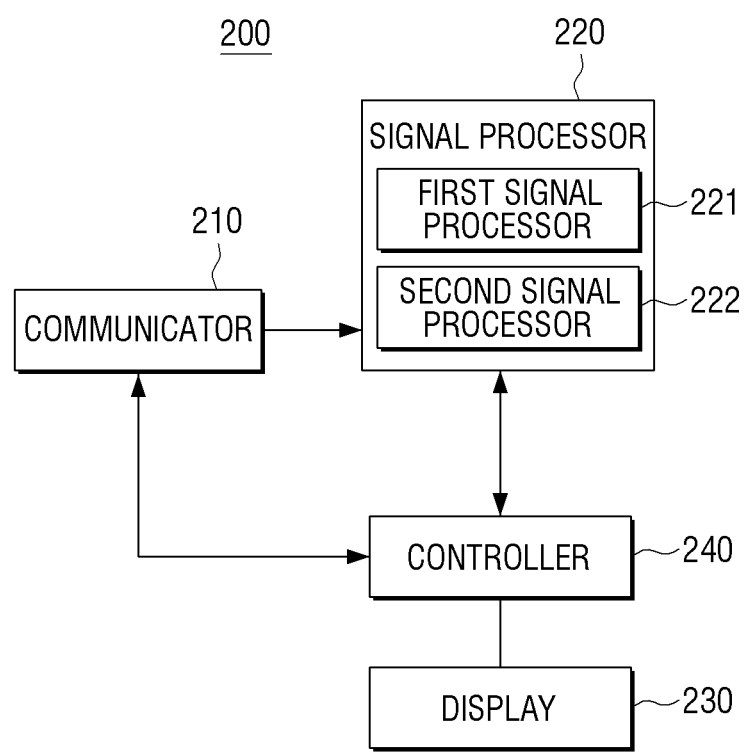
FIG. 3 is a block diagram describing the configurations of a display apparatus according to an exemplary embodiment.

FIG. 3 is a block diagram describing the configurations of a display apparatus according to an exemplary embodiment. Referring to FIG. 3, the display apparatus 200 may include, for example, a communicator 210, a signal processor 220, a display 230, and a controller 240.

The communicator 210 is connected to the A/V receiving apparatus 100 and can transmit or receive a signal. Specifically, the communicator 210 can receive an audio signal return request along with a video signal and an audio signal from the A/V receiving apparatus 100, and can transmit an audio signal to the A/V receiving apparatus 100 according to an audio signal return request.

The signal processor 220 can include a first signal processor 221, which processes a video signal and a second signal processor 222, which processes an audio signal. In addition, the signal processor 220 can synchronize and output the signal-processed video signal and audio signal.

Time required to process a video signal inside the signal processor 220 and the time required to process an audio signal is different. However, seen from outside of the signal processor 220, a video signal and an audio signal are synchronized and output together, and thus it is seen that time required to process a video signal and time required to process an audio signal are the same. Therefore, by transmitting this audio signal to the A/V receiving apparatus, time required to process a video signal in the display apparatus 200 can be calculated by the A/V receiving apparatus.

The controller 240 controls overall operations of the display apparatus 200.

First of all, the controller 240, when an audio signal return request is received along with a video signal and an audio signal through the communicator 210, can control the signal processor 220 to process a video signal and an audio signal.

In addition, the controller 240, by activating HDMI-based ARC function according to an audio signal return request, can control the communicator 210 to return the signal-processed audio signal to the A/V receiving apparatus 100. And, the controller 240 can control the display unit 240 to display the signal-processed video signal.

The display apparatus 200 illustrated in FIG. 3, upon an audio signal return request, can transmit an audio signal to the A/V receiving apparatus 100 so that the A/V receiving apparatus 100 can calculate time required to process a video signal in the display apparatus 200.

Figure 4:
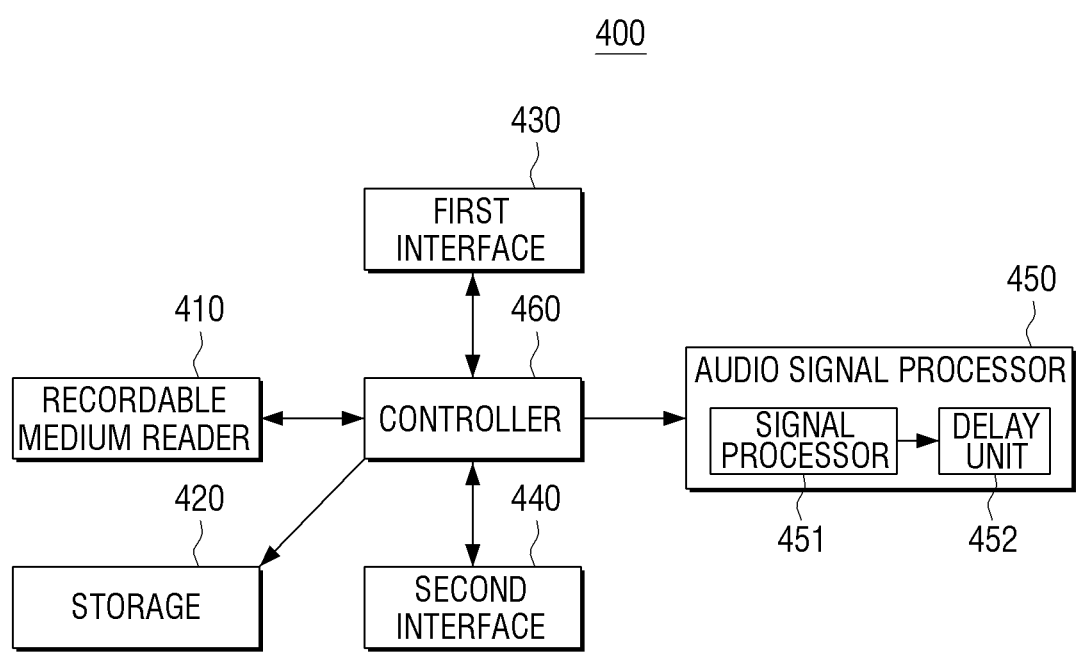
FIG. 4 is a block diagram describing the configurations of an A/V reproducing apparatus according to an exemplary embodiment.

FIG. 4 is a block diagram describing the configurations of an A/V reproducing apparatus according to an exemplary embodiment. Referring to FIG. 4, an A/V reproducing apparatus 400 may include, for example, a recordable medium reader 410, a storage 420, a first interface 430, a second interface 440, an audio signal processor 450, and a controller 460.

The A/V reproducing apparatus 400, similar to the A/V receiving apparatus 100 illustrated in FIG. 1, can be connected to the display apparatus 200 and the audio signal output apparatus 300, and can compose the A/V signal processing system of another exemplary embodiment. Meanwhile, the A/V reproducing apparatus 400 can output a video signal and an audio signal read inside to the display apparatus 200 and the audio signal output apparatus 300.

The recordable medium reader 410, when a recordable medium is inserted to an insert unit (not illustrated) of the A/V reproducing apparatus 400, can read the recordable medium. When the recordable medium is read, various contents recorded in the recordable medium can be read. These various contents include a movie composed of a video signal and an audio signal, soap opera, game, animation, etc. Also, a recordable medium can include CD, DVD, a smart media card, a compact flash memory card, an SD (Secure Digital) memory card, and a USB memory card, etc.

A storage 420 saves various files which can be content files such as a movie, soap opera, game, animation, etc. or data files such as a document.

The first interface 430 can be connected to the display apparatus 200 and can transmit or receive a signal. And, the second interface 440 can be connected to the audio signal output apparatus 300 and can transmit or receive a signal. In this case, the first interface 430 and the second interface 440 can be connected to the display apparatus 200 and the audio signal output apparatus 300 through a HDMI cable.

The audio signal processor 450 includes the signal processor 451 and delay unit 452.

The signal processor 451 can process an audio signal of a content read in the recordable medium reader 410.

The delay unit 452 can delay and output an audio signal which is signal-processed in the signal processor 451 according to or as much as a preset delay value.

The controller 460 controls overall operations of the A/V receiving apparatus 400.

Specifically, the controller 460, according to user input, can control content reading operation of the recordable medium reader 410, or can read a content file from the storage 420. In this case, the recordable medium reader 410 can read a content and transmit a video signal and an audio signal included in the content to the controller 460. In addition, the storage 420 also can transmit a video signal and an audio signal included in a content file to the controller 460.

The controller 460, when a video signal and an audio signal are received, transmits an audio signal return request to the display apparatus 200 along with the video signal and the audio signal.

Herein, the audio signal return request is a signal to active a HDMI-based ARC function. Therefore, when the display apparatus 200 receives the audio signal return request, an HDMI-based ARC function is activated, and the audio signal processed along with the video signal is returned to the A/V reproducing apparatus 400.

Meanwhile, the controller 460, when an audio signal is returned from the display apparatus 200, can calculate output time difference of the video signal and the audio signal based on return time of the audio signal.

Specifically, the controller 460 can calculate the first time required to process the video signal in the display apparatus 200 based on transmitting timing of the audio signal return request and a return time of the audio signal. And, the second time which is required from receiving timing of the audio signal by the recordable medium reader 410 or the storage 420, to outputting timing of the audio signal from the audio signal output apparatus 300 can be calculated.

Also, in order to calculate the second time, the controller 460, from receiving timing of an audio signal from the recordable medium reader 410 or the storage 420, calculates the first delay time which is required from processing an audio signal to transmitting the signal to the audio signal output apparatus 300. In addition, the second delay time which is required from transmitting timing of the processed audio signal to the audio signal output apparatus 300, to outputting time of an audio signal by the audio signal output apparatus 300 can be calculated, and the second time can be calculated by adding the first delay time and the second delay time.

The controller 460, according to the output time difference, can delay and transmit an audio signal to the audio signal output apparatus. That is, the controller 460 can control the delay unit 452 to delay an audio signal according to or as much as a delay value corresponding to the output time difference.

According to FIG. 4, the A/V reproducing apparatus 400 can accurately synchronize a video signal and an audio signal by calculating the output time difference of a video signal and an audio signal, and delaying/outputting an audio signal according to or as much as the output time difference.

Meanwhile, in FIG. 4, it has been described that the A/V reproducing apparatus 400 outputs a video signal and an audio signal read inside to the display apparatus 200 and the audio signal output apparatus 300, but the present disclosure is not limited to this. That is, the A/V reproducing apparatus 400, as illustrated in FIG. 2, can receive a video signal and an audio signal from the external source apparatus 10 including the A/V signal receiving unit 110. In addition, the A/V receiving apparatus 100 illustrated in FIG. 2 can further include the recordable medium reader 410 or the storage 420 illustrated in FIG. 4.

Figure 5:
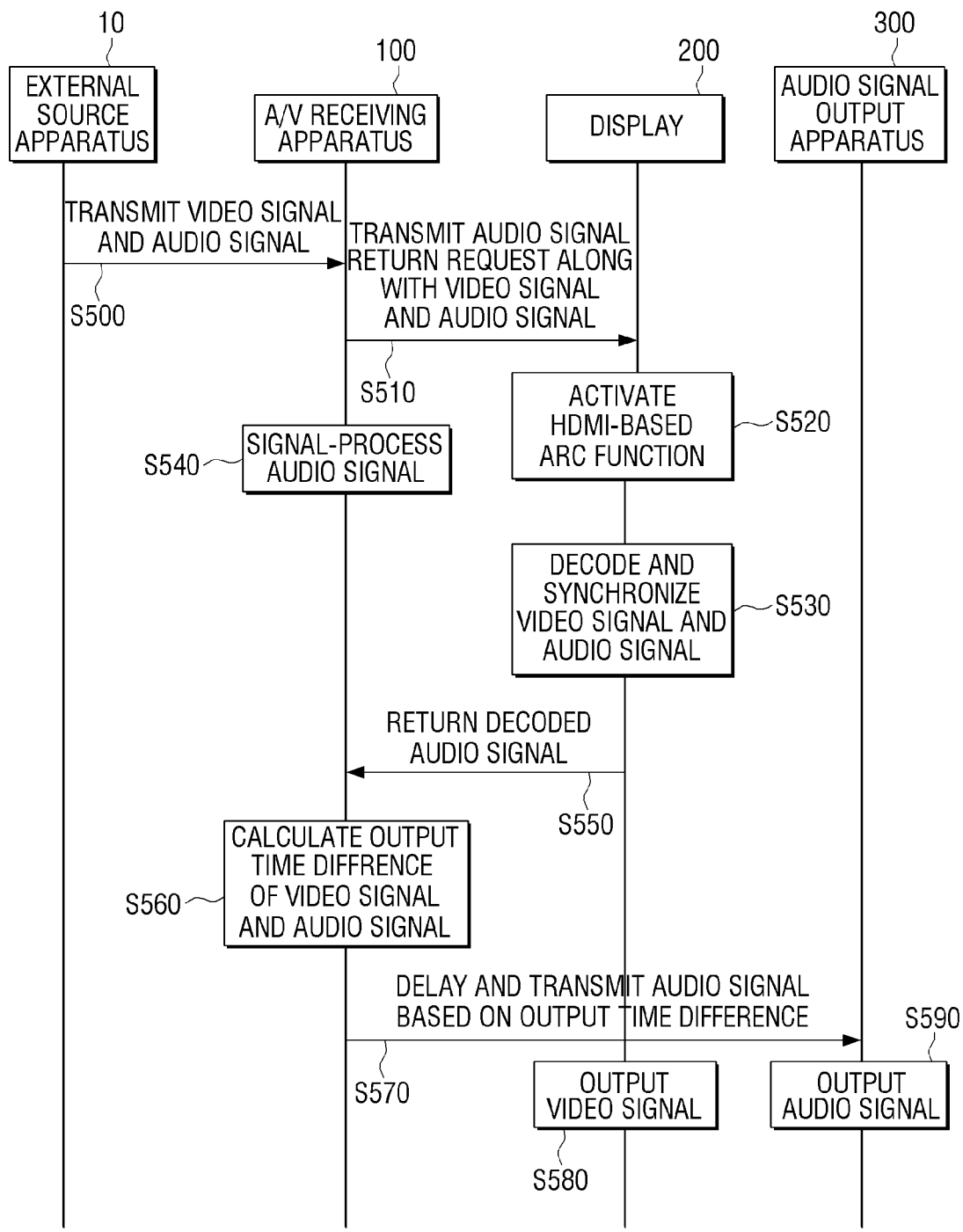
FIG. 5 is a flow chart to explain a method for delay of output of an audio signal according to an exemplary embodiment.

FIG. 5 is a flow chart to explain a method for delay of output of an audio signal according to an exemplary embodiment. The method for delaying output of the audio signal can be performed by the A/V signal processing system illustrated in FIG. 1, as an example.

The A/V receiving apparatus 100, if a video signal and an audio signal are transmitted to the A/V receiving apparatus 100 from the external source apparatus 10 (S500), transmits an audio signal return request along with a video signal and an audio signal to the display apparatus 200 (S510).

The display apparatus 200, according to an audio signal return request, activates HDMI-based ARC function, and decodes/synchronizes a video signal and an audio signal (S530). And, upon an audio signal return request from the A/V receiving apparatus 100 (S550), returns a decoded audio signal to the A/V receiving apparatus 100 (S550).

The A/V receiving apparatus 100, before the decoded audio signal is returned, processes an audio signal (S540). Then, after the audio signal is returned, the A/V receiving apparatus 100 calculates the output time difference of a video signal and an audio signal (S560).

Figure 7:
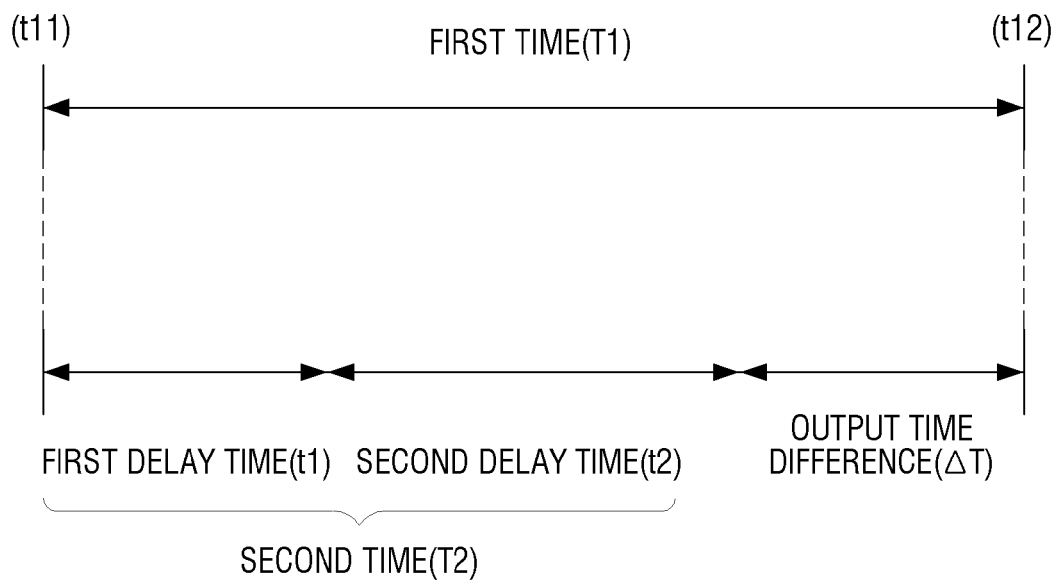
FIG. 7 is a drawing illustrating a method for calculating an output time difference according to an exemplary embodiment.

The method of calculating the output time difference of a video signal and an audio signal] output time difference is described by using FIG. 7.

As illustrated in FIG. 7, the A/V receiving apparatus 100 can calculate time—from transmitting timing of an audio signal return request to the display apparatus 200 along with a video signal and an audio signal (t11), to timing of receiving a return of an audio signal from the display apparatus 200 (t12)—as the first time (T1) which is required for handling a video signal in the display apparatus 200.

In addition, the A/V receiving apparatus 100 can calculate the second time (T2) which is required from receiving timing of an audio signal to outputting timing of an audio signal in the audio signal outputting apparatus.

Herein, the first delay time (t1), which is required from receiving timing of a video signal and an audio signal from the external source apparatus 10, to processing an audio signal and transmitting the audio signal to the audio signal output apparatus 300 can be calculated, the second delay time (t2) which is required from transmitting timing of an audio signal to the audio signal output apparatus 300, to outputting an audio signal by the audio signal output apparatus 300 can be calculated, and the second time (T2) by adding the first delay time (t1) and the second delay time (t2) can be calculated.

Meanwhile, the audio signal output apparatus 300, when an audio signal is received from the A/V receiving apparatus 100 and output, transmits a response signal at the same time with the output that an audio signal is output to the A/V receiving apparatus 100. Therefore, the A/V receiving apparatus 100 can know the timing when the audio signal output apparatus 300 outputs an audio signal. Provided, however, that the A/V receiving apparatus 100 should know the timing of output of an audio signal by the audio signal output apparatus 300 in advance, and thus a test audio signal can be transmitted to the audio signal output apparatus 300 before calculating the output time difference.

The A/V receiving apparatus 100, as illustrated in FIG. 7, can calculate the first time (T1) and the second time (T2), and also calculate the output time difference (ΔT) by subtracting the second time (T2) from the first time (T1).

The A/V receiving apparatus 100, according to the output time difference, delays an audio signal, and transmits the audio signal to the audio signal output apparatus 300 (S570). Therefore, the display apparatus 200 and the audio signal output apparatus 300 output a video signal and an audio signal that are synchronized in time (S580, S590).

Figure 6:
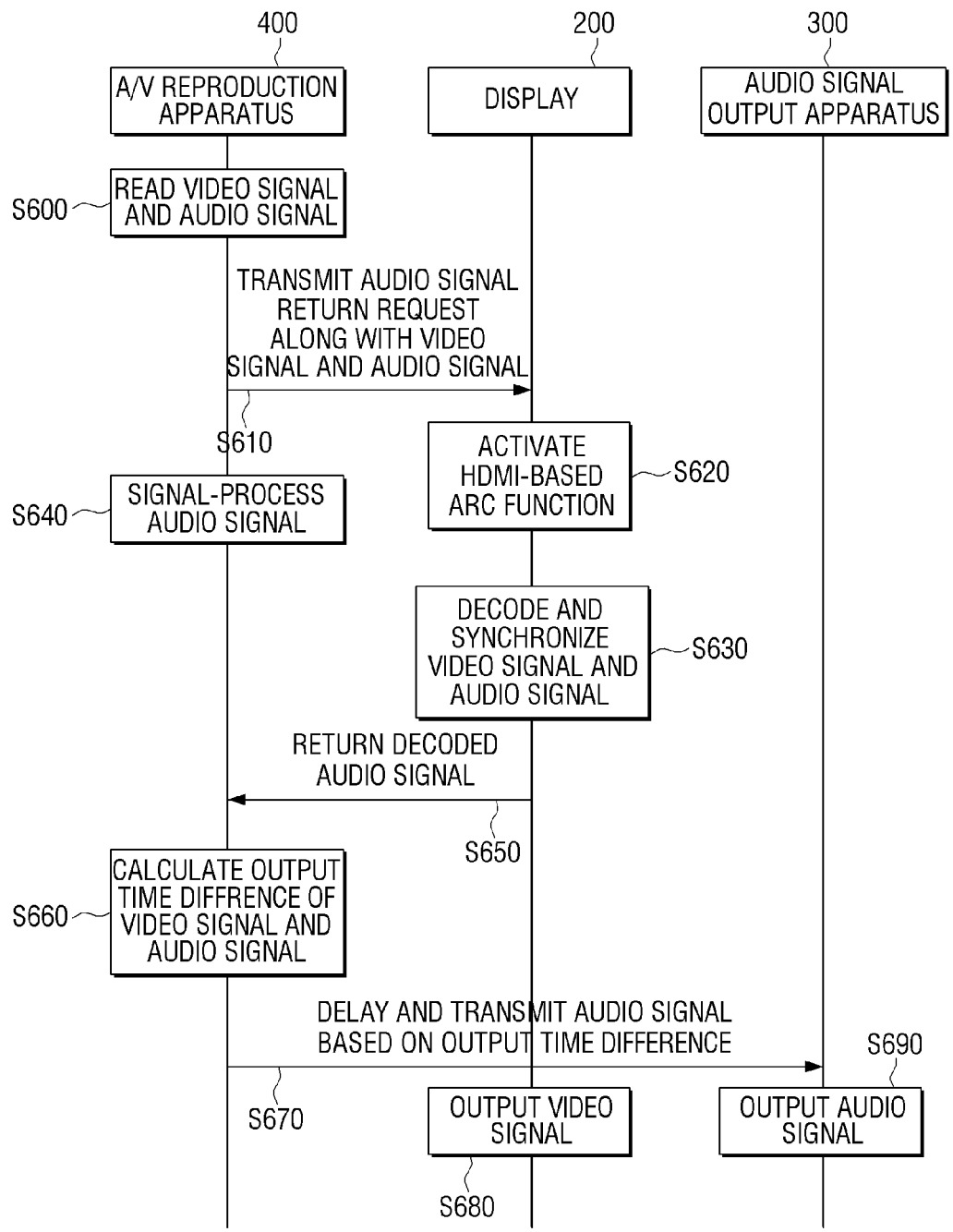
FIG. 6 is a flow chart to explain a method for delay of output of an audio signal according to another exemplary embodiment.

FIG. 6 is a flow chart to explain a method for delaying of output of an audio signal according to another exemplary embodiment. The method for delaying output of the audio signal can be performed by the A/V signal processing system including the A/V reproducing apparatus 400 as illustrated in FIG. 4.

The A/V reproducing apparatus 400, when a video signal and an audio signal are read (S600), transmits an audio signal return request to the display apparatus 200 along with a video signal and an audio signal (S610). Here, a video signal and an audio signal can be read from a separate recordable medium or read from the storage 420 of the A/V reproducing apparatus 400.

The display apparatus 200, according to an audio signal return request, activates HDMI-based ARC function and decodes/synchronizes a video signal and an audio signal (S630). In addition, according to an audio signal return request, the apparatus returns the decoded audio signal to the A/V reproducing apparatus 400 (S650).

The A/V reproducing apparatus 400, before the decoded audio signal is returned, processes an audio signal (S640), and when an audio signal is returned, calculates the output time difference of a video signal and an audio signal (S660). Herein, the method for calculating the output time difference of a video signal and an audio signal has been specified in FIG. 5, and will be omitted.

The A/V reproducing apparatus 400 delays an audio signal according to the output time difference and transmits the signal to the audio signal output apparatus 300 (S670). Accordingly, the display apparatus 200 and the audio signal output apparatus 300 output a video signal and an audio signal respectively at the same time (S680, S690).

The method for delaying output of an audio signal as illustrated in FIGS. 5 and 6 can delay output of an audio signal in consideration of time required to process a video signal, as the time required to process a video signal in the display apparatus 200 and the time required to process an audio signal in the A/V receiving apparatus 100 or A/V reproducing apparatus 200 can be known. Therefore, sync between a video signal which is displayed in the display apparatus 200 which is located distantly from the A/V receiving apparatus 100, and an audio signal output from the audio signal output apparatus 300 can be aligned.

Meanwhile, the method for delaying output of an audio signal according to the exemplary embodiment can be embodied as a program including an executable algorithm which can be executed in computer, and the program can be stored in a non-transitory computer readable medium and provided.

A non-transitory computer-readable medium indicates media which semi-permanently stores data and is readable with an apparatus, not a media which stores data for short time such as register, cache, memory, etc. Specifically, the above-described various applications or programs may be stored and provided in a non-transitory computer-readable medium such as CD, DVD, hard disk, Blue-ray disk, USB, memory card, ROM.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the A/V receiving apparatus described herein.

The foregoing embodiments and advantages are merely exemplary and are not to be construed as limiting the present disclosure. The present teaching can be readily applied to other types of apparatuses. Also, the description of the exemplary embodiments of the present inventive concept is intended to be illustrative, and not to limit the range of the claims, and many alternatives, modifications, and variations will be apparent to those skilled in the art.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An A/V receiving apparatus comprising:
a first interface configured to connect to a display apparatus;
a second interface configured to connect to an audio signal output apparatus; and
a controller configured to transmit a request for activating an audio signal return channel (ARC) function of the display apparatus, to the display apparatus via the first interface, to transmit an audio signal and a video signal to the display apparatus via the first interface, the audio signal being returned from the display apparatus via an audio signal return channel of the first interface which is activated by the request, the controller being configured to calculate an output time difference of the video signal and the returned audio signal based on a return timing of the returned audio signal, to delay an audio signal to be provided to the audio signal output apparatus according to the output time difference and to transmit the delayed audio signal via the second interface to the audio signal output apparatus.

2. The apparatus as claimed in claim 1, wherein the controller transmits the request for activating the ARC function of the display apparatus to the display apparatus via the first interface along with the video signal and the audio signal, calculates a first time required to process the video signal in the display apparatus, based on a transmitting timing of the request for activating the ARC function and a return timing of the returned audio signal, calculates a second time required from a receiving timing of the returned audio signal, to an output timing of the audio signal from the audio signal output apparatus via the second interface, and calculates the output time difference by subtracting the second time from the first time.

3. The apparatus as claimed in claim 2, wherein the controller calculates the second time by adding a first delay time required from a processing timing of the audio signal, to a transmitting timing of the audio signal to the audio signal output apparatus, and a second delay time required from a transmitting timing of the audio signal to the audio signal output apparatus, to an outputting timing of the audio signal by the audio signal output apparatus.

4. The apparatus as claimed in claim 1, wherein the ARC function is a HDMI (High Definition Multimedia Interface)-based ARC function.

5. The apparatus as claimed in claim 1, further comprising:
a signal processor configured to process the audio signal; and
a delay unit to delay and output the signal-processed audio signal by a pre-set delay value.

6. The apparatus as claimed in claim 5, wherein the controller updates the pre-set delay value of the delay unit according to the calculated output time difference.

7. The apparatus as claimed in claim 1, further comprising:
an A/V signal receiving unit to receive the video signal and the audio signal.

8. The apparatus as claimed in claim 1, further comprising:
a recordable medium reader to read a recordable medium and read a content recorded in the recordable medium, wherein the controller receives the video signal and the audio signal included in the content from the recordable medium reader.

9. An A/V signal processing system, comprising:
an audio signal output apparatus;
a display apparatus; and
an A/V receiving apparatus to receive a video signal and an audio signal, to transmit a request for activating an audio signal return channel (ARC) function of the display apparatus, to the display apparatus along with the video signal and the audio signal, the audio signal being returned from the display apparatus, the AN receiving apparatus being configured to calculate an output time difference of the video signal and the returned audio signal based on a return time of the returned audio signal, to delay an audio signal to be provided to the audio signal output apparatus according to the output time difference and to transmit the delayed audio signal to the audio signal output apparatus.

10. The system as claimed in claim 9, wherein the display apparatus comprises:
a display;
a communicator to communicate with the A/V receiving apparatus, wherein the communicator receives the request for activating the ARC function of the display apparatus along with the video signal and the audio signal;
a signal processing unit to process and synchronize the video signal and audio signal; and
a controller to control the communicator to return a signal-processed audio signal to the AN receiving unit according to the request for activating the ARC function of the display apparatus and to display the signal-processed video signal.

11. The system as claimed in claim 9, wherein the ARC function is a HDMI (High Definition Multimedia Interface)-based ARC function.

12. The system as claimed in claim 10, wherein the A/V receiving apparatus calculates a first time required to process the video signal in the display apparatus, based on a transmitting timing of the request for activating the ARC function of the display apparatus and a return time of the returned audio signal, calculates a second time required from a receiving timing of the returned audio signal from the display apparatus, to an outputting timing of the audio signal from the audio signal output apparatus, and calculates the output time difference by subtracting the second time from the first time.

13. The system as claimed in claim 12, wherein the A/V receiving apparatus calculates the second time by adding a first delay time required from a receiving timing of the audio signal from the display apparatus, to a processing and outputting timing of the audio signal to the audio signal output apparatus, and the second delay time required from a transmitting timing of the audio signal to the audio signal output apparatus, to an outputting timing of the audio signal by the audio signal output apparatus.

14. The system as claimed in claim 10, wherein the A/V receiving apparatus delays the signal-processed audio signal according to the calculated output time difference and transmits the signal-processed audio signal to the audio signal output apparatus.

15. A method for delaying output of an audio signal, comprising:

transmitting a request for activating an audio signal return channel (ARC) function of a display apparatus to the display apparatus;
transmitting an audio signal and a video signal to the display apparatus, the audio signal being returned from the display apparatus via an audio signal return channel which is activated by the request;
calculating an output time difference of the video signal and the returned audio signal based on a return time of the returned audio signal;
delaying an audio signal to be provided to an audio signal output apparatus according to the output time difference; and
transmitting the delayed audio signal to the audio signal output apparatus.

16. The method as claimed in claim 15,
wherein the calculating of the output time difference of the video signal and the audio signal comprises:
calculating a first time required to process the video signal in the display apparatus based on a transmitting timing of the request for activating the ARC function and a return time of the returned audio signal;
calculating a second time required from a receiving time of the returned audio signal, to an outputting timing of the returned audio signal by the audio signal output apparatus; and
calculating the output time difference by deducting the first time and the second time.

17. The method as claimed in claim 16,
wherein the calculating the second time comprises:
calculating the second time by adding a first delay time required from a receiving timing of the audio signal, to a processing and transmitting timing of the audio signal to an audio signal output apparatus, and a second delay time required from a transmitting timing of the audio signal to the audio signal output apparatus, to an outputting timing of the audio signal by the audio signal output apparatus.

18. The method as claimed in claim 15,
wherein the ARC function is a HDMI (High Definition Multimedia Interface)-based ARC function.

19. A non-transitory medium comprising computer readable code to control at least one processor to implement the method of claim 15.

20. An A/V transceiver apparatus configured to connect to a display apparatus, the AN transceiver apparatus comprising:
a controller configured to transmit a video signal, an audio signal, and a request for activating an audio signal return channel (ARC) function of the display apparatus to the display apparatus, the audio signal being returned from the display apparatus via an audio signal return channel which is activated by the request;
an audio signal processor to calculate an output time difference between the video signal and the returned audio signal based on a return time of the returned audio signal; and
a delay unit to delay an audio signal to be provided to the audio signal output apparatus according to the calculated output time difference and to output the delayed audio signal.

* * * * *